(12) United States Patent
Boldrini (10) Patent No.: US 12,275,034 B2
(45) Date of Patent: Apr. 15, 2025

(54) COATING PRODUCTION LINE SYSTEM

(71) Applicant: coatingAI AG, Winterthur (CH)

(72) Inventor: Marlon Boldrini, Zürich (CH)

(73) Assignee: coatingAI AG, Winterthur (CH)

( * ) Notice: Subject to any disclaimer, the term of this patent is extended or adjusted under 35 U.S.C. 154(b) by 0 days.

(21) Appl. No.: 18/062,242

(22) Filed: Dec. 6, 2022

(65) Prior Publication Data
US 2023/0173533 A1 Jun. 8, 2023

(30) Foreign Application Priority Data
Dec. 6, 2021 (EP) ..................................... 21212625

(51) Int. Cl.
*B05C 11/10* (2006.01)
*B05C 19/00* (2006.01)
*B05D 7/24* (2006.01)

(52) U.S. Cl.
CPC ........ *B05C 11/1021* (2013.01); *B05C 19/008* (2013.01); *B05D 7/24* (2013.01); *B05D 2401/32* (2013.01)

(58) Field of Classification Search
USPC ........ 118/308, 309, 665, 666, 667, 712, 713
See application file for complete search history.

(56) References Cited

U.S. PATENT DOCUMENTS

| | | |
|---|---|---|
| 2005/0096796 A1 | 5/2005 | Filev |
| 2006/0177566 A1 | 8/2006 | Price |
| 2011/0277685 A1* | 11/2011 | Callendret ............ B05B 3/1092 |
| | | 118/300 |

FOREIGN PATENT DOCUMENTS

| | | |
|---|---|---|
| CN | 104841592 A | 8/2015 |
| CN | 111007811 A | 4/2020 |
| CN | 111068950 A | 4/2020 |
| CN | 112403723 A | 2/2021 |
| KR | 10-2005-0028138 A | 3/2005 |
| WO | 2005/085489 A1 | 9/2005 |
| WO | 2020/160746 A1 | 8/2020 |

OTHER PUBLICATIONS

European Search Report for 21212625.4 dated May 6, 2022.

* cited by examiner

*Primary Examiner* — Yewebdar T Tadesse
(74) *Attorney, Agent, or Firm* — Sughrue Mion, PLLC (57) ABSTRACT

A coating production line system for coating work pieces comprises a coating powder, a coating apparatus, an inspection unit to measure the thickness of the applied coating, a conveyor unit to move the work pieces through the system, and a control unit to use thickness requirements and coating parameters to control the coating apparatus based on said coating parameters with a machine learning instance. A database comprises coating powder characteristics parameter as input vector for the machine learning instance for generating an output vector to control the coating apparatus being a first additional part vector. The control unit determines the coating quality based on a comparison between the thickness data acquired from the inspection unit and the retrieved thickness requirement data as second additional part vector. The first and second additional part vectors are fed back as additional parts to the next input vector for the machine learning instance.

11 Claims, 4 Drawing Sheets

COATING PRODUCTION LINE SYSTEM

FIELD OF THE INVENTION

The present invention relates to a coating production line system for coating work pieces and a method controlling the coating process.

PRIOR ART

CN 111007811A relates to the field of color aluminum production and processing, in particular to an aluminum plate color coating production system based on big data cloud intelligent control. The system comprises a cloud intelligent server and a big data intelligent manufacturing platform connected to the cloud intelligent server, a plurality of groups of roller painting production devices connected with the big data intelligent manufacturing platform, and terminal equipment. Production data of the roller painting production devices is collected through the big data intelligent manufacturing platform and uploaded to the cloud intelligent server; the cloud intelligent server performs analysis and machine learning on the uploaded data and automatically generates and optimizes production data; an optimal production model is established and applied to the roller painting production devices; and through analysis and machine learning of abnormal data, returning to the system to guide production is realized, and adjustment and optimization of process parameters are achieved, so that the key process of color aluminum plate production is changed into intelligent control from previous artificial experience control, production data is conveniently and quickly optimized and solidified, the process is accurately controlled, and the product quality is stable and controllable.

CN 20468536U as well as CN 104841592A disclose an intelligence automatic spraying unit based on digital bus, including arm, spraying device, valve unit and electrically controlled device. The spraying device includes a body and a shower nozzle, wherein the control of the spraying process is intended to reduce the degree of air pollution in the spraying room or the spraying room, to improve the recovery rate of the paint exhaust gas, and to realize intelligent spraying which is based on pattern recognition sensors, position sensors and distance sensors on the body.

WO 2005/085489 A1 discloses a method for coating a work piece, wherein a material is applied to the work piece by thermal spraying, wherein the spraying process is monitored online in that properties of the particles located in the spray jet are detected and provided as actual values, in that the actual values are compared directly or characteristic values derived from the actual values are compared with setpoint values, and wherein, in the event of a deviation of the actual values or characteristic values from the predetermined setpoint values, process parameters for the thermal spraying are automatically adapted by a controller on the basis of at least one neural network. the detected properties of the spray jet are particle temperature and/or particle velocity and/or particle size and/or luminous intensity of the particles. The detected properties of the spray jet are particle temperature and/or particle velocity and/or particle size and/or luminous intensity of the particles.

KR 20050028138 A relates to a system and a method for controlling coating using Artificial Intelligence to offer a target coating thickness by actively managing diverse changes of a painting condition with construction of a minimum basic database. The basic database maps a shape pattern of paints having a Gaussian distribution different from each coating condition. A data input part receives the coating condition. A paint shape pattern extractor extracts the shape pattern of the mapped paint by finding the coating condition having a high similarity with the input coating condition from the basic database. A positional discharge calculator calculates discharge of a next spraying position in order to obtain the target coating thickness made by overlap of the neighboring coating patterns, while calculating the positional discharge according to a shape of a coating target based on the extracted coating shape pattern. A control code generator generates a control code for discharging the calculated positional discharge to a spay gun.

CN 112403723 A provides a coating production line monitoring system based on machine vision. The coating production line monitoring system comprises a main conveying roller bed, an image recognition mechanism, a work piece transferring mechanism and branch conveying roller beds, wherein the branch conveying roller beds are arranged on the discharging side of the main conveying roller bed, and the work piece transferring mechanism is used for transferring coating work pieces on the main conveying roller bed to the corresponding branch conveying roller beds. According to the coating production line monitoring system based on machine vision, the image recognition mechanism is used for conducting image recognition on the coating work pieces conveyed on the main conveying roller bed, the next procedure that all the coating work pieces need to be processed is determined, and therefore the coating work pieces are transferred to the corresponding branch conveying roller beds through the work piece transferring mechanism; and the work pieces are conveyed to corresponding process treatment equipment, therefore, the automatic identification and transferring in the coating process are realized, and the coating efficiency is improved.

CN 111068950 discloses a method for controlling flow velocity of an LED coating machine coating head. The method comprises the following steps of selecting a correlation quantity as an input of a BP neural network model according to the actual operation condition of an LED coating machine, and taking the coating flow velocity as an output of a BP neural network; recording and storing on-site historical data, selecting the data as a training sample set, and obtaining predicted coating head flow velocity through a BP neural network method; and adopting a historical data iteration mode to adjust the coating head flow velocity predicted by a charging cylinder body air pressure control model to be continuously close to ideal flow velocity of the coating head improving the coating process of the LED coating machine.

Coating in large-scale manufacturing industry is automatic. The automatic coating production line includes a conveying unit and a coating unit. A baking or drying unit can be provided depending on the coating material to be sprayed for faster drying of the coated work piece. Environmental and safety requirements usually require the presence of a dust removing and exhaust unit. The conveying mechanism runs through the entire automatic coating production line, and the work piece to be coated is inserted in the automatic coating production line, optionally cleaned by the dust removing unit, and then coated in a dedicated coating space or room. After entering the baking unit for drying, and then outputting through the conveying mechanism, the industrial waste gas containing the dust and mist coating exhaust gas is usually discharged through the exhaust unit.

WO 2020/160746 A1 discloses a method for modelling a coating process comprising a plurality of coating parameters with the steps of: dispensing, by means of the coating process during K work cycles, a coating on each of K pieces of objects to thereby obtain K pieces of coatings; recording, during each of the K work cycles, coating variable values of p coating parameters at M instances to thereby obtain recording results; and measuring at least one coating property at m locations of each of the K pieces of coatings to thereby obtain measurement results. The method has as specific step determining a digital twin of the coating process on the basis of the recording results and the measurement. By using results from a large amount of classical quality control measurements together with corresponding coating parameter information. Such a digital twin of the coating process can be determined through statistical processing of such big data. The digital twin may be used either for automatic adjustment of the coating parameters to obtain an improved coating quality, for prediction of the coating quality right after a work cycle to obtain an improved quality control, or for both.

US 2006/177566 A1 discloses a method to determine the thickness in spray coating, monitoring the spraying process and providing a non-destructive measurement method.

US 2005/096796 A1 discloses a method of optimizing a paint process for applying a paint layer on an article using a neural network since the number of possible factors that effect the overall process (inputs) and the number of measurable characteristics of the paint finish (outputs) are in the range of thousands. Furthermore, a high volume/large scale process would be under considerable disturbances in variation of environmental parameters, paint parameters and equipment.

Although wet paint and powder coating are similar processes, the behaviour of the coating substances in the processes is very different. The above mentioned last three patent applications only seem feasible for processes in which: a) wet paint is used, b.) the geometry to be coated remains the same, and c.) the paint remains the same.

SUMMARY OF THE INVENTION

Based on the known art it is an object of the invention to provide a coating production line system for improving the coating process and inter alia the coating quality over the entire work piece surface which was coated for small series of even complex work pieces with changing coating requirements with high quality at a competitive level.

A coating production line system for coating work pieces according to the invention comprises a coating powder, a coating apparatus configured to provide a coating for the work pieces based on the coating powder; an inspection unit configured to measure the thickness of the applied coating, a conveyor unit configured to move the work pieces through the coating apparatus and the inspection unit in this order, and a control unit configured to use thickness requirements and coating parameters to control the coating apparatus based on said coating parameters with a machine learning instance. A database comprises powder characteristics parameter, related to the composition of the coating power, as input vector for the machine learning instance for generating an output vector to control the coating apparatus being at the same time a first additional part vector. The control unit determines the coating quality based on a comparison between the thickness data acquired from the inspection unit and the retrieved thickness requirement data as second additional part vector. The first and second additional part vectors are fed back as additional parts to the next input vector for the machine learning instance.

There are multiple thousand different coating powders commercially available. Prior art coating systems use control parameters for the coating unit based on experience. The invention is based on the insight that for commercially available coating powders the behavior of those powders in relation to the process parameters depend on the composition of those powders. However, information on the compositions used are not directly available. There are myriad of different compositions with different properties as e.g. U.S. 6,337,137B1.

Therefore, the system proposes a composition related powder characteristics parameter as input vector for a machine learning instance in the control unit. The invention starts with a database of input vectors based on supervised learning. The system is then used in a reinforced learning mode using measured quality values together with current control parameters as additional input vector parts.

Said database can further comprise, for each work piece type of a plurality of work piece types, coating parameters and thickness requirement data as part of said input vector. Such work piece types can be flat surfaces, surfaces with a raised edge, trough like work pieces and e.g. for a direct application rims for car wheels.

Additionally, beside manual choice of such a work piece type, the system can further comprise an optical detection unit configured to take images of the work pieces to be coated before entering the coating unit and connected to the control unit. Then the control unit is configured to determine the type of work piece to be coated based on image data of the optical detection unit through comparison with the work piece image related data of the database. In this respect the determination is based on image comparison and can comprise further input vector parts for the reinforced learning of the system.

A humidity and/or temperature sensor relating to the environmental conditions of the coating unit can be present in or near the coating unit wherein the control unit is configured to add a humidity and/or temperature parameter as additional part to the input vector for the machine learning instance.

The input vector portions of the coating powder characteristics relating to the coating powder used in the coating unit are based on one or more of the following five parameters:

Coloring type, binding material type, surface finish type, binding material versus color pigment ratio and grain size. Coefficients of the input vector portions of the coating powder characteristics based on said parameters coloring type, binding material type, surface finish type, binding material versus color pigment ratio and grain size have decreasing values in the sequence from coloring type to grain size or are 0, i.e. the coefficient and thus the importance of the coloring type is higher than the coefficient and thus the importance of the binding material type and so on for the parameters surface finish type, binding material versus color pigment ratio and grain size.

The simplest application of this rule is the use of only the coloring type parameter and exclude the other four types from the machine learning instance.

Another embodiment uses a fixed and predetermined coloring type of the coating powder, as e.g. organic, and uses at least one of the four other parameters within the machine learning instance. As before, coefficients of the input vector portions of the coating powder characteristics based on parameters being one or more of binding material type, surface finish type, binding material versus color pigment ratio and grain size have preferably decreasing values in the sequence from binding material type to grain size or are 0.

The coloring type parameter can be determined between Organic, Metallic bonded or Metallic non-bonded. The binding material type can be determined between Polyester, Epoxy, Polyurethane, Polyester and Epoxy mixed or Polyester and Acrylic mixed. The surface finish type can be determined between smooth, fine structured or structured. The binding material versus color pigment ratio can be derived and determined between light, dark and optionally grey or color. The grain size parameter can be determined as the percentage of the powder having a grain size smaller than two grain size values, e.g. 40%<30 μm & 95%<100 μm.

A method for coating work pieces in a coating production line system for work pieces starts with establishing or accessing a database via the control unit, wherein the database comprises coating parameters and thickness requirement data for a work piece to be coated as well as coating powder characteristics parameter related to the composition of the coating powder. This set-up requirement is followed by method steps as: retrieving thickness requirements and coating parameters from the database to control a coating apparatus based on said coating parameters, retrieving composition of the coating powder related coating powder characteristics parameter from the database as input vector for a machine learning instance of the control unit; generating an output vector by the machine learning instance to control the coating apparatus being at the same time a first additional part vector; determining thickness data of the coated work piece by an inspection unit; determining the coating quality based on a comparison between the determined thickness data and the retrieved thickness requirement data as second additional part vector; and feeding back the first and second additional part vectors as additional parts to the next input vector for the machine learning instance, thus improving and adapting the production process over the generations of coated work pieces.

Powder coating is considered—in comparison with wet coating—as advantageous for large series of simply constructed blanks. Wet coating is usually connected by someone skilled in the art with complex blank forms, small series needs. Therefore, it is also an object of the present invention to achieve the advantages of powder coating for small series of complex blanks.

Further embodiments of the invention are laid down in the dependent claims.

BRIEF DESCRIPTION OF DRAWINGS

Preferred embodiments of the invention are described in the following with reference to the drawings, which are for the purpose of illustrating the present preferred embodiments of the invention and not for the purpose of limiting the same. In the drawings.

DETAILED DESCRIPTION OF THE INVENTION

Figure 1:
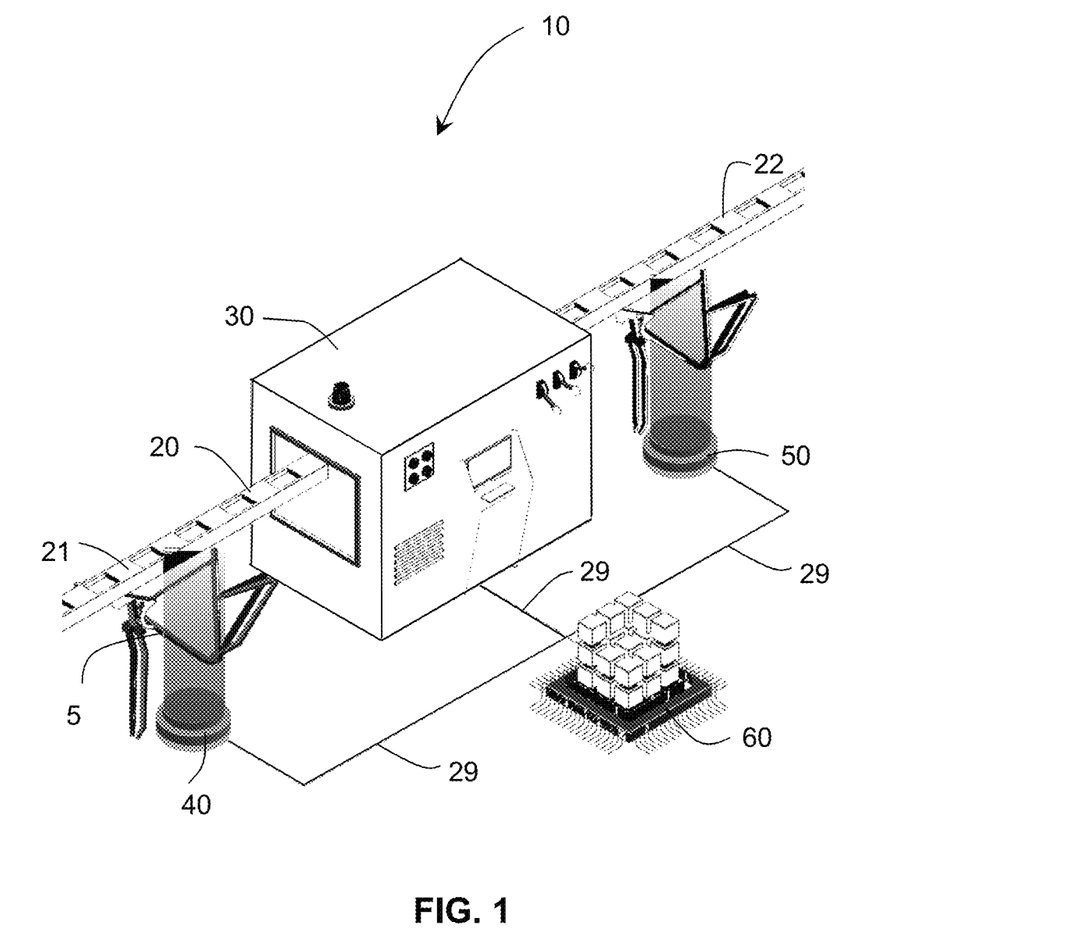
FIG. 1 shows a schematical view of a coating production line according to an embodiment of the invention.

FIG. 1 shows a schematical view of a coating production line 10 according to an embodiment of the invention.

The automatic coating production line 10 comprises a conveying unit 20, a coating unit 30 and optionally a baking unit for drying (not shown) as well as a dust removing and exhaust unit which can be integrated with the coating unit 30. The conveying mechanism of the conveying unit 20 runs through the entire automatic coating production line 10, and the work piece 5 to be coated is inserted in the automatic coating production line 10, optionally cleaned by a dust removing unit, and then coated in said dedicated coating space or room by a coating unit 30. After entering the baking unit for drying, and then outputting through the conveying mechanism 20, the industrial waste gas containing the dust and mist coating exhaust gas is discharged through the exhaust unit.

The work piece 5 is positioned and/or fastened on the conveying unit 20 or is forwarded to the automatic coating production line 10 at the entry point 21 and leaves the automatic coating production line 10 at the exit point 22.

Between the entry point 21 and the coating unit 30 can be provided an optical detection unit 40 for detecting the type of work piece 5 to be coated. In an alternative embodiment, the type of work piece 5 can be provided as a predetermined parameter data to a control unit 60. Between the coating unit 30 and the exit point 22 is provided an optical inspection unit 50.

The optical detection unit 40, the optical inspection unit 50 as well as the coating unit are connected via communication lines 29 with the before mentioned control unit 60. The conveying unit 20 is also connected via a communication line with the control unit 60, allowing the control unit 60 at least to issue a stop command to the conveying unit 20. The communication lines 29 are shown as physical lines; they can also be realized by wireless communication lines.

The control unit 60 can comprise a computer, a programmable logic controller (PLC) and an HMI interface. Various sensors as position detecting sensors on the conveying unit 20, as a temperature sensor and a humidity sensor near or in the coating unit 30 can be present and communicate with the control unit 60, allowing the control unit 60 to control the movement and determining the parameters to be delivered to the coating unit for coating the work pieces 5 within the automatic coating production line 10. A HMI interface is provided for entering further coating parameters. In the present invention, the plurality of sensors comprise the optical inspection unit 50 and optionally the optical detection unit 40 as well as a temperature and humidity sensor.

The optical inspection unit 50 and the optical detection unit 40 are shown as a base from which a space column is monitored. The units 40 and 50 can comprise one or more cameras, especially a stereo and or LiDAR camera. The optical inspection unit 50 can especially comprise a coating inspection gauge, a hyperspectral camera or an infrared camera, i.e. a non-destructive sensor measuring the thickness of the coating of the coated work piece 5, preferably as a contactless measurement.

Figure 2:
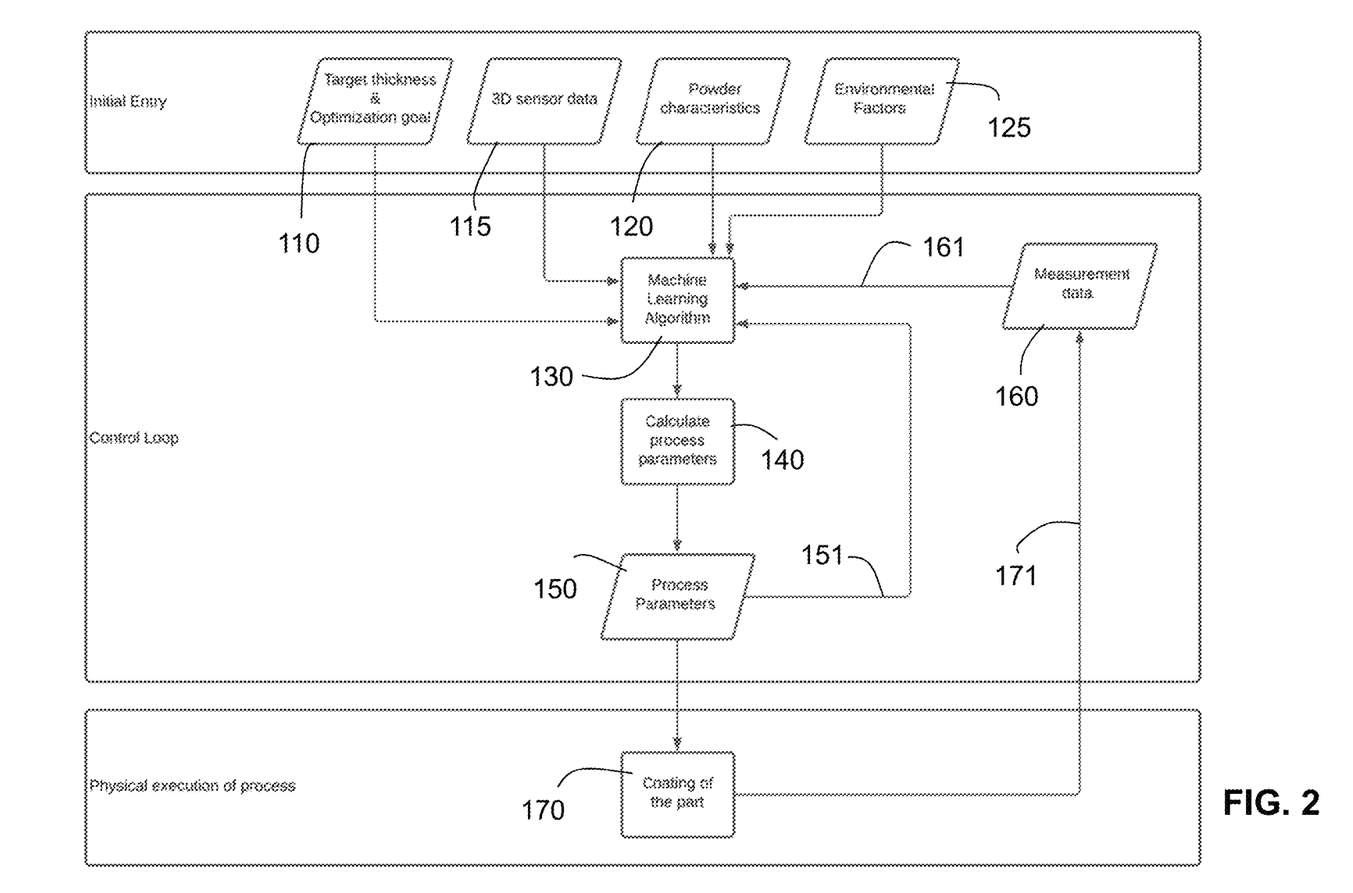
FIG. 2 shows a flow chart of a control method of the coating production line according to an embodiment of the invention.

FIG. 2 shows a flow chart of a control method of the coating production line 10 according to an embodiment of the invention.

The box 110 is related to a target thickness parameter and optionally optimization goal parameter being part of the HMI portion of the device, since prior to executing the method data has to be entered. This relates inter alia to the target thickness parameter 110 which comprises the definition of the minimum thickness requirement for a specific work piece type which requirement can vary depending on different surface portions of the work piece 5. The optimization goal is an optional additional entry value. Standard is that the method and therefore the machine learning algorithm will aim and calculate for the process settings of the coating unit 30 which will allow the most homogeneous coating result, i.e. which deviates the least from the target thickness.

Other possibilities for the optimization goal would be optimization for line speed or coating efficiency. Line speed optimization is oriented to the length of the drying line. With a predetermined length of the drying line and the speed of the conveying unit, the time can be calculated which a coated work piece 5 remains in the automatic coating line, i.e. before it leaves the device. At this point in time the coated work piece 5 has to be cured. The optimization goal is then the maximum speed with an acceptable coating result. Coating efficiency is related to the amount of powder deposited on each work piece 5 obtaining said acceptable coating result.

Within one embodiment, the optical detection unit 40 is configured to detect and identify the presence of a work piece 5 on the conveying unit 20 at the space where the visual sensor, e.g. a camera, is directed to. The images generated by the optical detection unit 40 are 3D sensor data 115 transmitted via a communication line 29 to the control unit 60. The 3D sensor data 115 combines input from one or more 3D optical sensors as part of the optical detection unit 40, which deliver a point cloud of the work piece 5. The point clouds are captured over time while tracking the movement of the work piece 5. Through the movement, one sensor is able to "see" the work piece 5 from multiple angles. The point clouds are combined and processed into a single 3D representation of the work piece 5.

The control unit 60 is either adapted to identify the work piece 5 to be coated based on this 3D representation and thus choose from its memory data relating to a target thickness 110 of the intended coating and coating control parameters for the coating step 170. Then the control unit 60 comprises a database with coating parameters for such a specific work piece 5 out of a number of work piece types stored in the database. In another more general approach and embodiment, the database comprises coating parameters for a number of predefined work pieces types as e.g. a flat metal sheet, a flat metal sheet with a raised edge at one side, a trough shaped work piece, a rim of a car wheel. Then the machine learning algorithm 130 also take into account the identification of the work piece type through the above mentioned point cloud data. The identification of the work piece type can also start from manually entered parameters for the starting work piece type of the machine leaning calculation unit 130.

The control unit 60 comprises a machine learning algorithm 130 taking into account the optimization goal 110, parameters from the powder characteristics parameters 120 and optionally environmental factor parameters 125. The 3D sensor data 115 is shown as further input of the machine learning 130 although the detection of the work piece 5 type can be done before and only this type information is forwarded to module 130. The calculation module 130 also retrieves the target thickness parameter 110 defining and representing the minimum thickness.

The powder chosen for coating in an automatic powder coating line has a composition which is not known to the user. The powder characteristics 110 of the coating powders are defined or based on one or more of the following five parameters: coloring type, binding material type, surface finish type, binding material versus color pigment ratio and grain size. In other words, the input vector of the machine learning instance comprises values relating to the chosen values of specific powder characteristics 110.

The coloring type can be Organic, Metallic bonded or Metallic non-bonded. The coloring type information is about the composition of the powder. The binding material type can be determined between Polyester, Epoxy, Polyurethane, Polyester and Epoxy mixed or Polyester and Acrylic mixed. The surface finish type can be determined between smooth, fine structured or structured or an in-between value. The surface finish type information is indicating the amount of Polytetrafluoroethylene structures within the powder. The binding material versus color pigment ratio can be derived and determined by the color of the powder and can be between light and dark, optionally with an intermediate value as Grey or Color, if not light or dark. The color of the powder defines this ratio as white/light colors use higher amounts of pigments which in turn reduce the amount of binding material. Dark/black colors use less pigments and therefor have higher amounts of binding material. The ratio of binding material versus color pigment has an effect on the behavior of the powder within the process as color pigments are differently influenced by electrostatic effects and air flow than binding material particles. The grain size distribution is related to the distribution of the grain size and especially usually comprise two values as a percentage of the powder having a smaller grain size as a defined value and a second percentage having a smaller grain size as a second defined value. E.g. 40%<30 µm & 95%<100 µm.

The optional environmental factors 125 relate to the environment of the coating production line 10 represented by one or two parameters: humidity and temperature, which are measured during the coating process, i.e. when the coating line 10 is active.

The humidity value is the most important factor to be considered within the environmental factors in view of its influence on dielectric parameters. Temperature is a secondary value which helps to increase predictability.

The above mentioned values from unit 110, 115, 120, 125 are the input vectors for the machine learning core 130 of the control unit 60. They are used to generate output vectors which are transformed and calculated in a process parameter calculation unit 140 for a specific coating unit 30. The generated process parameters are fed to the coating unit 30 for the coating step 170 as physical execution of the process as well as fed back in loop 151 as first additional part of the input vector for the machine learning calculation 130.

When the coating step 170 is finished the then coated work piece 5 is then measured in the inspection unit 50, where measurement data 160 relating to the thickness are generated. This can be a single measurement value, a vector of several measurement of different parts of the coated work piece or an average value created base on such a measurement. The only requirement for the measurement process is non-destructive measurement. The measurement step 160 should be preferably contactless but measurements by contacting the surface are also possible. The result which can be a scalar or a vector of values is fed back in closing loop 161 as second additional part of the input vector for the machine learning calculation 130.

The first and second additional parts of the input vector stemming from the coating of the same work piece 5 are used in the next generation of optimization of process parameter calculation at result of the machine learning calculation 130.

Figure 3:
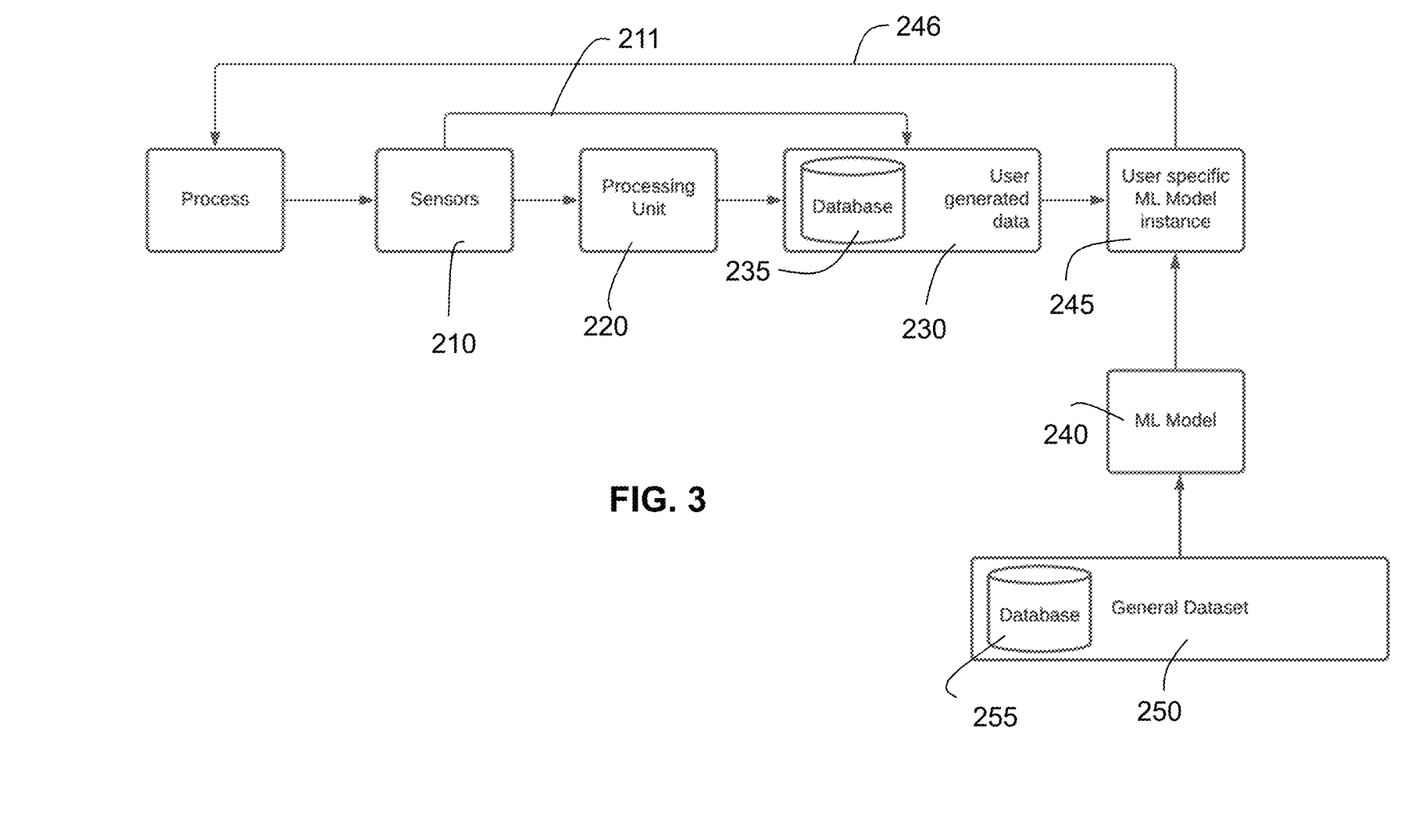
FIG. 3 shows a flowchart of the data flow and distribution of the data relating to the coating process in the control unit.

FIG. 3 shows a flowchart of the data flow and distribution of the data relating to the coating process in the control unit 60.

The machine learning starts from a machine learning model 240 based on a general data set 250 of coating parameters for a given set of work pieces stored in a general database 255 created in a supervised learning process. This machine learning model 240 is the basis for the user specific machine learning model instance 245, preferably available in a cloud environment.

Based on this machine learning model instance 245 possibly incorporating additional parameter adjustments based on a specific coating unit 30 on the premises of the user, the process is started by feeding the output vector of the machine learning model instance 245 with sensor information 210 as mentioned above for input vectors in the processing unit 220. Processing unit 220 is part of the control unit 60 and is related to the process parameter calculation 140 with the output being the coating machine process parameters 150. The respective values are stored in a user generated dataset 230 in a user specific database, wherein the measurement data 211 from the thickness sensors of sensor unit 210 are added. The feedback loop 151, 161 of FIG. 2 is then closed in the representation of FIG. 3 with feeding this data to the user specific machine learning model instance 245.

Figure 4:
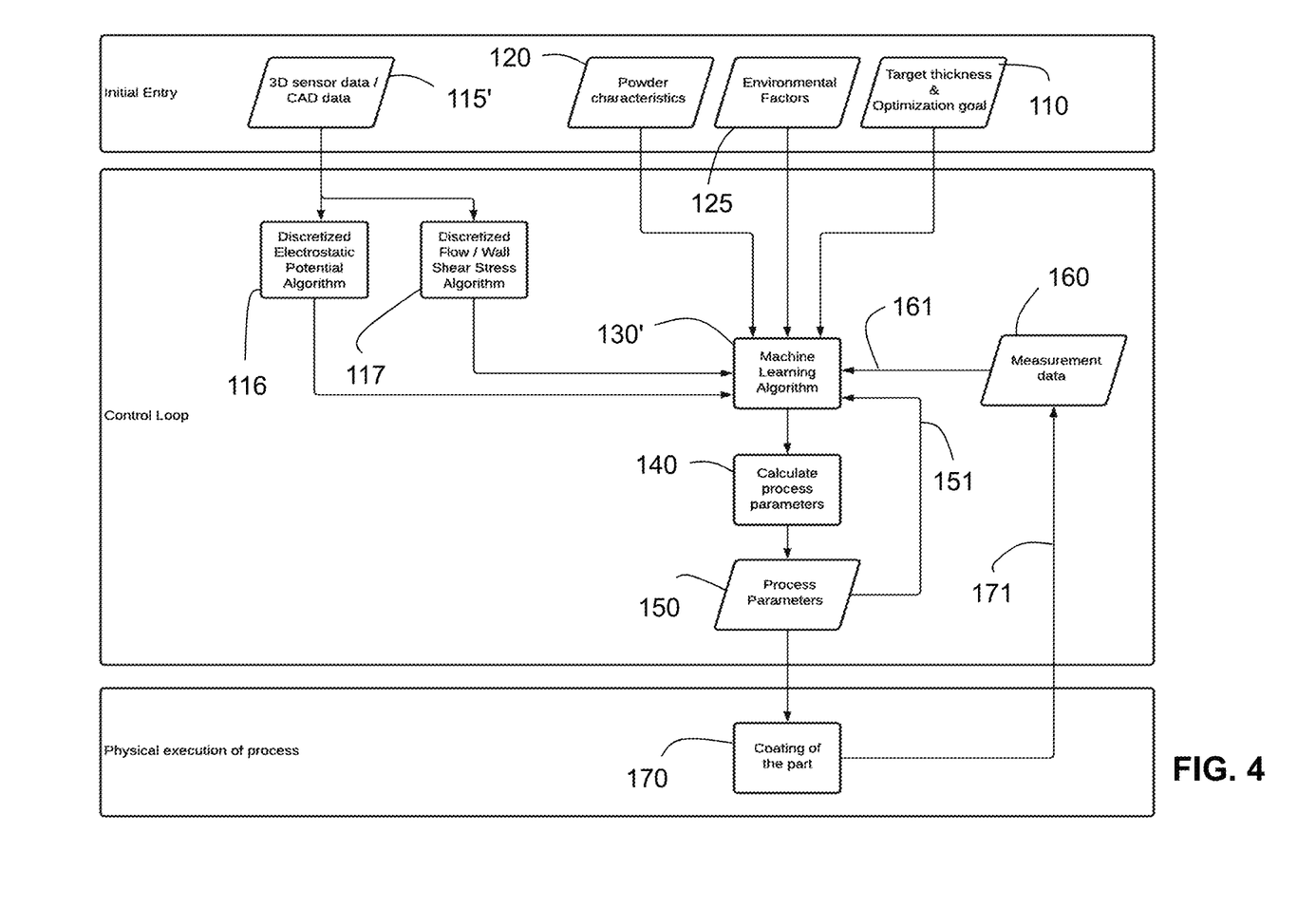
FIG. 4 shows a flow chart of a control method of the coating production line according to a further embodiment of the invention.

FIG. 4 shows a flow chart of a control method of the coating production line 10 according to a further embodiment of the invention. All features with the same reference numerals as provided in FIG. 2 are used in the same way in the embodiment of FIG. 4.

The box 110 is related to a target thickness parameter and optionally optimization goal parameter being part of the HMI portion of the device.

Within one option of embodiment according to FIG. 4, the optical detection unit 40 is configured to detect and identify the presence of a work piece 5 on the conveying unit 20 at the space where the visual sensor, e.g. a camera, is directed to. The images generated by the optical detection unit 40 are 3D sensor data 115' transmitted via a communication line 29 to the control unit 60. The 3D sensor data 115' are combined with predetermined CAD data relating to the work piece 5 to be coated.

Based on the detection of the work piece 5 to be coated, the discretized electrostatic potential of the work piece 5 is determined to deliver a further input vector portion 116 for the machine learning algorithm 130'. Although the box 116 mentioned an algorithm as such, these calculations can be determined for the known work pieces 5 beforehand based on physical models to that the input vector portion can just be loaded from a electrostatic potential value database in box 116.

A further additional input vector portion for the machine learning algorithm 130' can be generated based on the discretized flow and wall shear stress values as such input vector portion 117, since wall friction depends on the properties of both the powder particles and the wall material leading to the result that internal corners of the work piece are receiving less powder material as coating material and thus have reduced thickness. This is taken into consideration with box 117.

The control unit 60 comprises said machine learning algorithm 130' taking into account the optimization goal 110, parameters from the powder characteristics parameters 120 based and related to the composition of the power used, parameters from the discretized electrostatic potential 116, the discretized shear stress values 117 and optionally environmental factor parameters 125. The calculation module 130' also retrieves the target thickness parameter 110 defining and representing the minimum thickness.

LIST OF REFERENCE SIGNS 5 work piece
10 coating production line
20 conveying unit
21 entry point
22 exit point
29 communication line
30 coating unit
40 optical detection unit
50 optical inspection unit
60 control unit
110 target thickness parameter
115 3D sensor data
115' 3D sensor data/CAD data
116 discretized electrostatic potential data
117 discretized wall shear stress data
120 powder characteristics parameter vector
125 environmental factor vector
130 machine learning algorithm
130' machine learning algorithm
140 calculate optimum process parameters for a coating unit
150 process parameter calculation
151 process parameter feedback data
160 measurement data
161 measurement parameter feedback data
170 coating step
171 submitting coated work piece to thickness measurement
210 sensor
211 forward of measurement data
220 processing unit
230 user generated data set
235 user database
240 machine learning model
245 user specific adapted model instance
250 general dataset
255 general data database

The invention claimed is:

1. A coating production line system for coating work pieces comprising:
  a coating powder source;
  a coating apparatus configured to provide a coating for the work pieces with a coating powder provided by the coating powder source;
  an inspection unit configured to measure a thickness of a coating applied to the work pieces;
  a conveyor unit configured to move the work pieces through the coating apparatus and the inspection unit in this order;
  a control unit in communication with the inspection unit, the coating apparatus and the conveyor unit; and
  a database comprising coating parameters and thickness requirement data for the work pieces to be coated as well as a coating powder characteristics parameter, related to a composition of the coating powder used in the coating apparatus and based on one or more of the following five parameters of the coating powder: coloring type, binding material type, surface finish type, binding material versus color pigment ratio and grain size;

wherein the control unit is configured to retrieve thickness requirements and coating parameters from the database, to control the coating apparatus based on said coating parameters, wherein the control unit comprises a machine learning instance;

wherein the control unit is further configured to retrieve from the database the coating powder characteristics parameter as an input vector for the machine learning instance for generating an output vector to control the coating apparatus, wherein the output vector defines at the same time a first additional part vector; and wherein the control unit is further configured to determine the coating quality based on a comparison between the thickness data acquired from the inspection unit for a coated work piece and the retrieved thickness requirement data as a second additional part vector; and wherein the control unit is configured to feed back the first additional part vector and the second additional part vector as additional parts to the next input vector for the machine learning instance.

2. The coating production line system according to claim 1, wherein the database further comprises, for each work piece type of a plurality of work piece types, coating parameters and thickness requirement data as further parts of said input vector.

3. The coating production line system according to claim 1, further comprising an optical detection unit configured to take images of the work pieces to be coated before entering the coating apparatus and connected to the control unit; and wherein the control unit is configured to determine the type of work piece to be coated based on image data of the optical detection unit through comparison with the work piece image related data of the database.

4. The coating production line system according to claim 1, further comprising a humidity and/or temperature sensor relating to the environmental conditions of the coating apparatus, wherein the control unit is configured to add a humidity and/or temperature parameter as additional part to the input vector for the machine learning instance.

5. The coating production line system according to claim 1, wherein coefficients of the input vector of the composition related coating powder characteristics based on said parameters coloring type, binding material type, surface finish type, binding material versus color pigment ratio and grain size have decreasing values in the sequence from coloring type to grain size or are 0.

6. The coating production line system according to claim 1, wherein input vector portions of coating powder characteristics relating to the composition of the coating powder used in the coating apparatus are based on one or more of the following four parameters of the coating powder: binding material type, surface finish type, binding material versus color pigment ratio and grain size, wherein a coloring type of the coating powder is predetermined.

7. The coating production line system according to claim 1, wherein the coloring type parameter is determined between Organic, Metallic bonded or Metallic non-bonded.

8. The coating production line system according to claim 1, wherein the binding material type parameter is determined between Polyester, Epoxy, Polyurethane, Polyester and Epoxy mixed or Polyester and Acrylic mixed.

9. The coating production line system according to claim 1, wherein the surface finish type parameter is determined between smooth, fine structured or structured.

10. The coating production line system according to claim 1, wherein the binding material versus color pigment ratio parameter is determined between light, dark and optionally grey or colour.

11. The coating production line system according to claim 1, wherein the grain size parameter is determined as the percentage of the powder having a grain size smaller than two grain size values.

* * * * *